US008120932B2

(12) United States Patent
Folts et al.

(10) Patent No.: US 8,120,932 B2
(45) Date of Patent: Feb. 21, 2012

(54) LOW VOLTAGE RIDE THROUGH

(75) Inventors: Douglas C. Folts, Baraboo, WI (US);
David J. Gritter, Wauwatosa, WI (US);
Michael P. Ross, Madison, WI (US)

(73) Assignee: American Superconductor Corporation, Devens, MA (US)

( * ) Notice: Subject to any disclaimer, the term of this patent is extended or adjusted under 35 U.S.C. 154(b) by 700 days.

(21) Appl. No.: 12/165,921

(22) Filed: Jul. 1, 2008

(65) Prior Publication Data

US 2010/0002475 A1  Jan. 7, 2010

(51) Int. Cl.
H02M 5/45 (2006.01)
H02M 5/458 (2006.01)
(52) U.S. Cl. .......................................... 363/37
(58) Field of Classification Search ............. 363/37; 361/20; 290/44
See application file for complete search history.

(56) References Cited

U.S. PATENT DOCUMENTS

| | | | | |
|---|---|---|---|---|
| 7,095,597 | B1 * | 8/2006 | Cousineau | 361/20 |
| 7,253,537 | B2 * | 8/2007 | Weng et al. | 290/44 |
| 2003/0067285 | A1 * | 4/2003 | Kehrli et al. | 323/207 |
| 2003/0151259 | A1 * | 8/2003 | Feddersen et al. | 290/44 |
| 2004/0027839 | A1 | 2/2004 | Deng et al. | |
| 2005/0122083 | A1 * | 6/2005 | Erdman et al. | 322/20 |
| 2005/0200337 | A1 | 9/2005 | Schreiber et al. | |
| 2006/0091674 | A1 * | 5/2006 | Fredette et al. | 290/40 C |
| 2007/0177314 | A1 * | 8/2007 | Weng et al. | 361/20 |
| 2007/0188282 | A1 * | 8/2007 | Folts et al. | 336/55 |
| 2008/0150285 | A1 | 6/2008 | Corcelles Pereira et al. | |
| 2009/0167088 | A1 | 7/2009 | Llorente Gonzalez | |

FOREIGN PATENT DOCUMENTS

| | | |
|---|---|---|
| DE | 10105892 | 9/2002 |
| EP | 0877475 | 11/1998 |
| EP | 1921738 | 5/2008 |
| ES | 2245608 | 1/2006 |
| WO | WO 2005/099063 | 10/2005 |
| WO | WO 2008/026973 | 3/2008 |

OTHER PUBLICATIONS

European Application No. 08450047.9, Filed Mar. 31, 2008.
European Application No. 08450046.1, Filed Mar. 31, 2008.
English Translation of Spanish Grid Code "Requirements Regarding Wind Power Facility Response to Grid Voltage Dips Proposal Sent to Ministry" (7 pages), publication date unknown, Oct. 2006.
Hingorani, Narain; Gyugyi, Laszlo: "Understanding FACTS, Concepts and Technology of Flexible AC Transmission Systems." New York: IEEE Press, 2000.

* cited by examiner

*Primary Examiner* — Jue Zhang
(74) *Attorney, Agent, or Firm* — Occhiuti Rohlicek & Tsao LLP

(57) ABSTRACT

A system for connecting a wind turbine generator to a utility power network includes a first power converter that converts an AC signal from the wind turbine generator to a DC signal and supplies a controlled amount of reactive current to the wind turbine generator. The system also includes a second power converter, connected in series with the first converter, which converts the DC signal from the first power converter to a line-side AC signal and supplies a controlled amount of current to the utility power network. A power dissipation element is coupled to the first and second power converters for dissipating power from the first power converter.

26 Claims, 9 Drawing Sheets

LOW VOLTAGE RIDE THROUGH

BACKGROUND

This application relates to wind turbine generators (WTGs).

Wind energy has emerged as the fastest growing source of energy, offering a clean, renewable, and ecological-friendly alternative to fossil-based energy supplies. At the present growth rate, wind energy conversion is projected to produce more than 117,000 MW by the year of 2009, claiming about 1.25% of the global electricity generation. In addition to their traditional role in servicing rural residences in grid-isolated areas, wind turbine generators are now increasingly installed in large-scale (e.g., multi-megawatt) wind farms and integrated into power grids that can deliver electricity to consumers nationwide.

The performance of a grid-connected WTG can be influenced by many factors, such as voltage fluctuations on the grid. For example, a short circuit on the grid may result in a sudden voltage drop, which reduces the effective drag on the WTG and may cause both the turbine and the generator to accelerate rapidly. To ensure safe operation, some WTGs have been designed to trip off-line (i.e., disconnect from the grid and shut down) as soon as grid voltage drops below a prescribed level (e.g., 85% of nominal voltage). After fault clearance, these WTGs enter a restart cycle that can last several minutes before resuming power transmission to the grid.

During this off-line period, the loss of power generation may impact the stability of utility grids to which WTGs are connected. As the number of grid-integrated wind plants/farms continues to grow, regulatory agencies in many countries have started to adopt strict interconnection standards that require large WTGs to remain online during disturbances and continue to operate for an extended period—a process called "low-voltage ride through" (LVRT).

Among various interconnection standards, the Spanish Grid Code, for example, requires WTGs to be able to sustain ("ride-through") line voltage at 20% of rated level for at least 500 ms. FIG. 1A shows an example of voltage transients when a low-voltage event occurs. In this case, after an initial dip of 500 ms, line voltage starts to recover and within 15 seconds has returned to 95% of nominal. During the entire low-voltage period (~15 s), the Spanish Grid Code requires WTGs to continue to operate and supply current in controlled amounts to help stabilize the grid. FIG. 1B shows the required current behavior, measured by the ratio of the magnitude of reactive current to total current ($I_{reactive}/I_{total}$) as a function of line voltage. Note that other countries may have different regulations on grid-connected WTGs' current and voltage behaviors in response to low voltage disturbances.

SUMMARY

In one general aspect of the invention, a system is provided for connecting a wind turbine generator to a utility power network. A first power converter converts an AC signal from the wind turbine generator to a DC signal and supplies a controlled amount of reactive current to the wind turbine generator. A second power converter, connected in series with the first converter, converts the DC signal from the first power converter to a line-side AC signal and supplies a controlled amount of current to the utility power network. A power dissipation element is coupled to the first and second power converters for dissipating power from the first power converter.

Embodiments of this aspect of the invention may include one or more of the following features.

The amount of current supplied to the utility power network satisfies a predetermined criterion associated with a voltage condition of the utility power network. The predetermined criterion may include that when a voltage of the utility power network falls below a predetermined threshold, the magnitude of reactive current supplied to the utility power network is at least twice as much as the magnitude of real current supplied to the utility power network.

The first and second power converters are connected via a DC bus. A capacitor is coupled to the DC bus. A first and second AC filter reactor may be coupled to the first and second power converter, respectively. The power dissipation element may include a resistor. The resistor may include a dynamic braking resistor. A controllable switching device may be coupled to the resistor for regulating a current passing through the resistor. A power factor correction unit may be provided for adjusting a power factor of the electric power supplied to the utility power network. The power factor correction unit may include a controllable capacitor that can be switched on and off by electrical signals.

In another general aspect of the invention, a control system is provided for controlling an interconnection between a wind turbine generator and a utility power network. Upon an occurrence of a low voltage event, the control system electrically opens a first path of the interconnection. A second path of the interconnection is controlled during the low voltage event to provide a first current suitable for maintaining an operation of the wind turbine generator and a second current having a predetermined characteristic associated with an operation of the utility power network.

Embodiments of this aspect of the invention may include one or more of the following features.

The control system may determine the occurrence of a low voltage event based on a voltage condition associated with the utility power network, or alternatively, on a current condition associated with the wind turbine generator, or a combination of both of these methods.

The first current includes a reactive current component sufficient for maintaining an excitation of the wind turbine generator. The second current includes a real current component and a reactive current component. During the low voltage event, the second current is controlled so that the magnitude of the reactive current component is at least twice the magnitude of the real current component.

The first path includes a switch unit controllable by external signals, and may further include a forced commutation circuit configured to provide a commutation signal to the switch unit. The second path includes a first power converter for converting AC power from the wind turbine generator to DC power and for providing the first current. A second power converter is connected in series with the first converter for converting the DC power from the first power converter to line-side AC power and for providing the second current. A power dissipation element is coupled to the first and second power converter for dissipating power from the first power converter. The power dissipation element may include a resistor and a controllable switching device coupled to the resistor configured for regulating a current passing through the resistor. A capacitor is coupled to the first and second power converter.

The control system may further control a power factor correction unit to adjust a power factor of the electric power supplied to the utility power network. The power factor correction unit may include a controllable capacitor that can be switched on and off by electrical signals.

Among other advantages and features, a system for connecting a wind turbine generator to a utility power network is provided. During normal operations, electric power generated by the WTG can be delivered to the utility power network with near unity power factor and negligible power loss in the LVRT system (e.g., less than 0.3%). When faults on the network cause line voltage to drop, the system maintains near nominal voltages at generator terminals and provides sufficient impedance to the generator. As a result, the WTG continues to operate without experiencing low-voltage impacts (e.g., over-speeding). The amounts of real and reactive power delivered to the network can also be controlled based on voltage conditions. For example, when desired, reactive power can be injected to the grid in sufficient amounts (e.g., at least twice the amount of real power) to help stabilize the utility network in a major low voltage event. In some cases, proper selection of power electronics and circuit design can also reduce system response time to faults.

Other features and advantages of the invention are apparent from the following description, and from the claims.

BRIEF DESCRIPTIONS OF DRAWINGS

FIGS. 1A and 1B illustrate some aspects of LVRT requirements in the Spanish Grid Code.

FIGS. 2A and 2B provide an overview and an exemplary implementation of a wind power generation system with LVRT capability, respectively.

DETAILED DESCRIPTIONS

1 System Overview

Figure 1A:
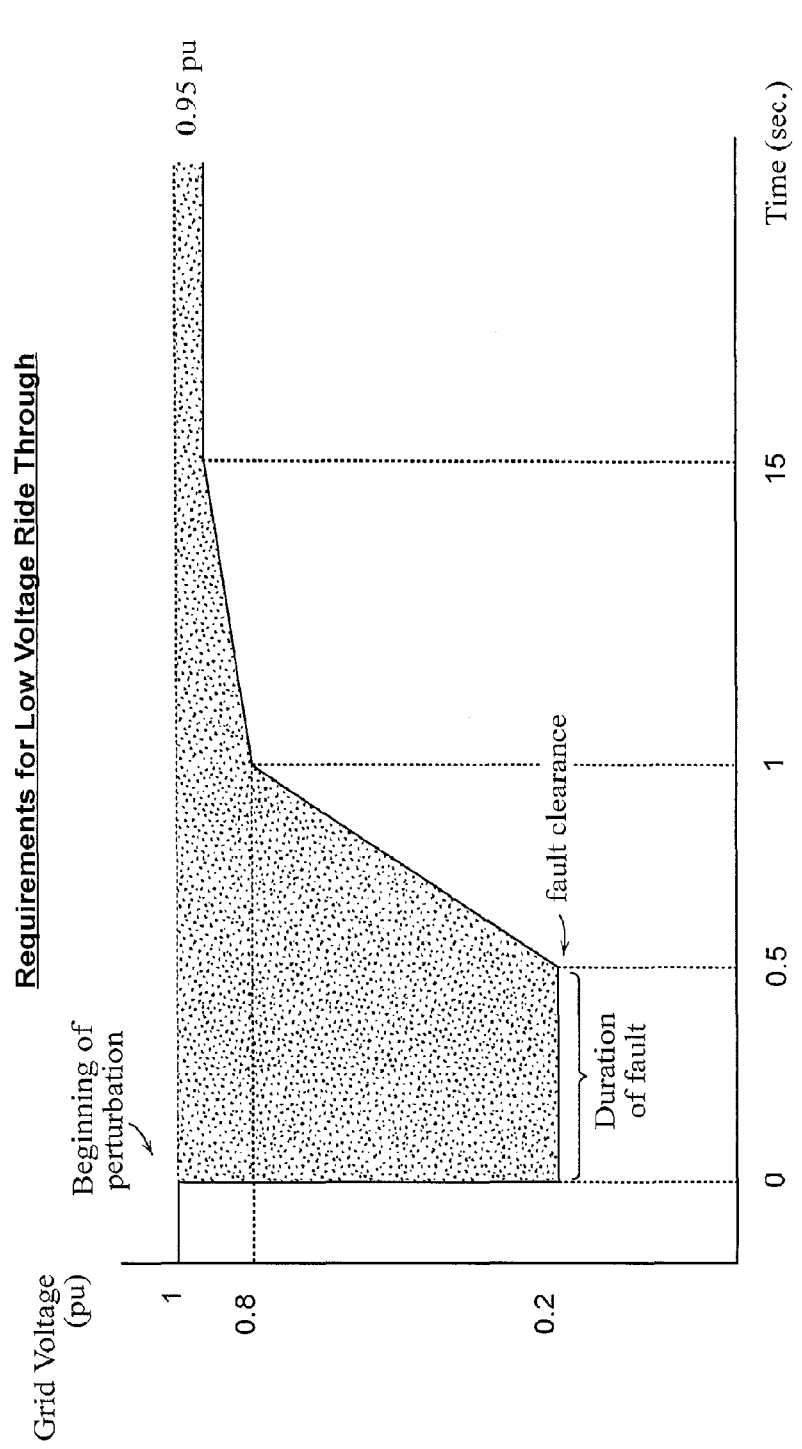
Figure 1B:
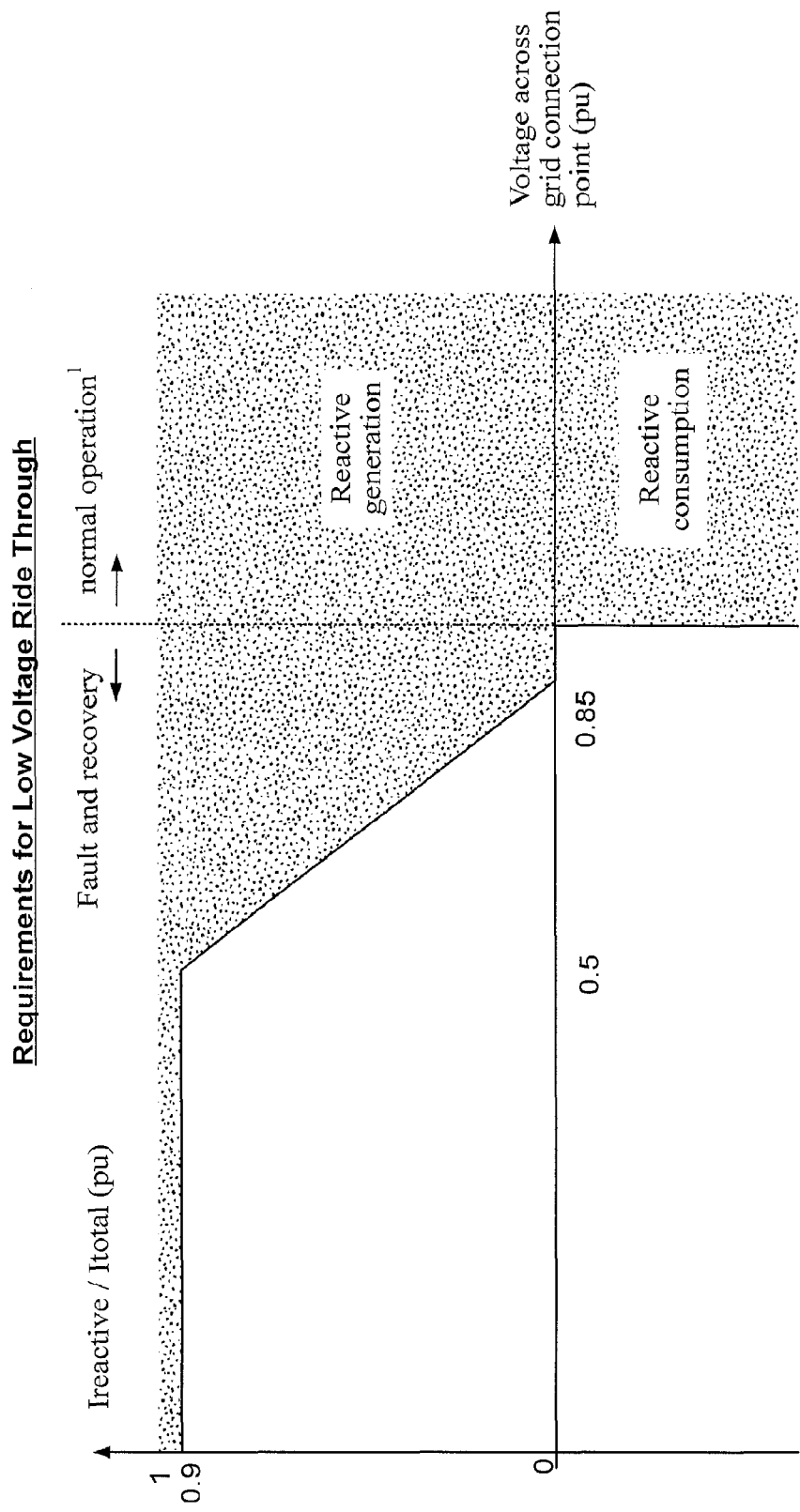
Figure 2A:
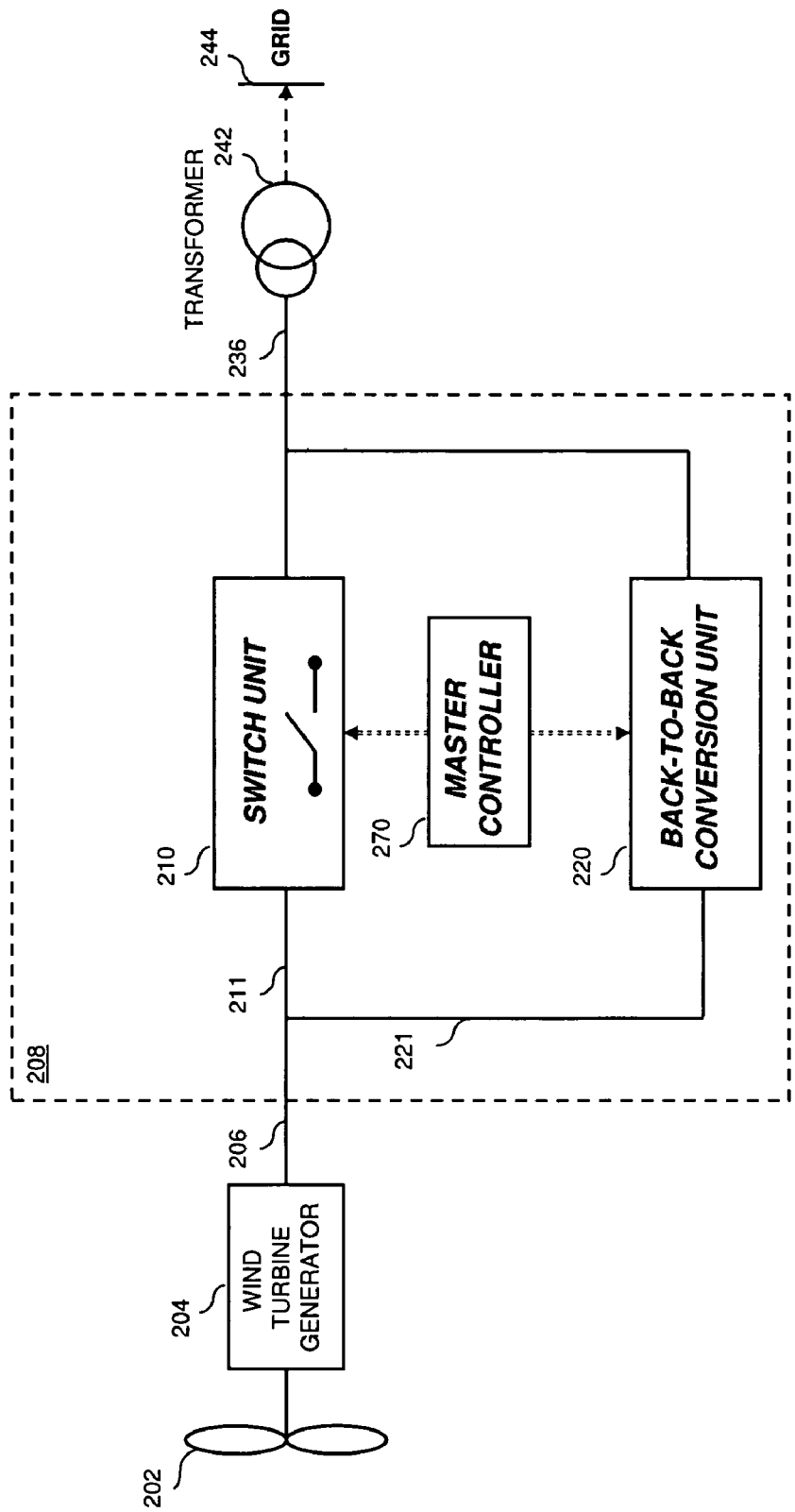

Referring to FIG. 2A, a wind power generation system 200 with LVRT capability includes a rotor 202 (e.g., a low speed propeller) which drives a wind turbine generator 204 for converting wind power to electric power in the form of alternating current (AC). Through an interconnection system 208, AC power is provided to a transformer 242, which by stepping up the AC voltage, transmits the power to a local grid 244.

The interconnection system 208 includes a switch unit 210 and a back-to-back conversion unit 220, which provide a first and second paths 211 and 221 respectively, between the generator 204 and the transformer 242. Generally, switch unit 210 can be electrically turned "ON" (closed) or "OFF" (open) by external signals (e.g., control signals) to allow or block current passage in first path 211. Switch unit 210 can be a single power electronic switch (e.g., a thyristor), or a circuit that functions essentially as an electric switch having at least two states of distinct impedance. Preferably, when gated "ON," switch unit 210 presents negligible impedance to the current generated by the generator 204, thereby minimizing potential power loss during transmission.

When the grid is operating under normal conditions (e.g., voltage fluctuation remains within ±10% of nominal), switch unit 210 is closed, allowing power from the generator to be transmitted via first path 211 to transformer 236 in full capacity. When a low voltage event occurs (e.g., grid voltage drops below 90% of nominal), switch unit 210 is quickly opened to block first path 211. Subsequently, the full output of the generator is delivered through second path 221 to back-to-back conversion unit 220. When the grid voltage drops significantly to, for example, one-fifth its nominal value (i.e. 20%), five times nominal current will flow for the grid to absorb the pre-sag power generated by the WTG. To prevent components in the WTG system from being overloaded during the low voltage event, back-to-back conversion unit 220 provides power in controlled amounts based on voltage conditions. Preferably, back-to-back conversion unit 220 also provides reactive current necessary to excite generator 204 so that the generator continues to operate and generate power without being affected by the voltage drop. Other functions of the back-to-back conversion unit include a means to absorb or dissipate the excess power from the WTG that cannot be absorbed by the grid and, optionally, provide reactive current to the grid to aid in post-fault voltage recovery, which is described in greater detail below.

In some examples, a master controller 270 is provided in interconnection system 208 to control power transmission between the generator and the grid. Preferably, master controller 270 is able to detect low voltage faults (as will be described in greater detail below) and act upon these faults to coordinate and control the operations of the switch and conversion units 210 and 220 to provide LVRT features of this power generation system. The implementation and logic of master controller 270 will be described in greater detail in the context of an exemplary interconnection system provided below.

2 An Example of an Interconnection System

Figure 2B:
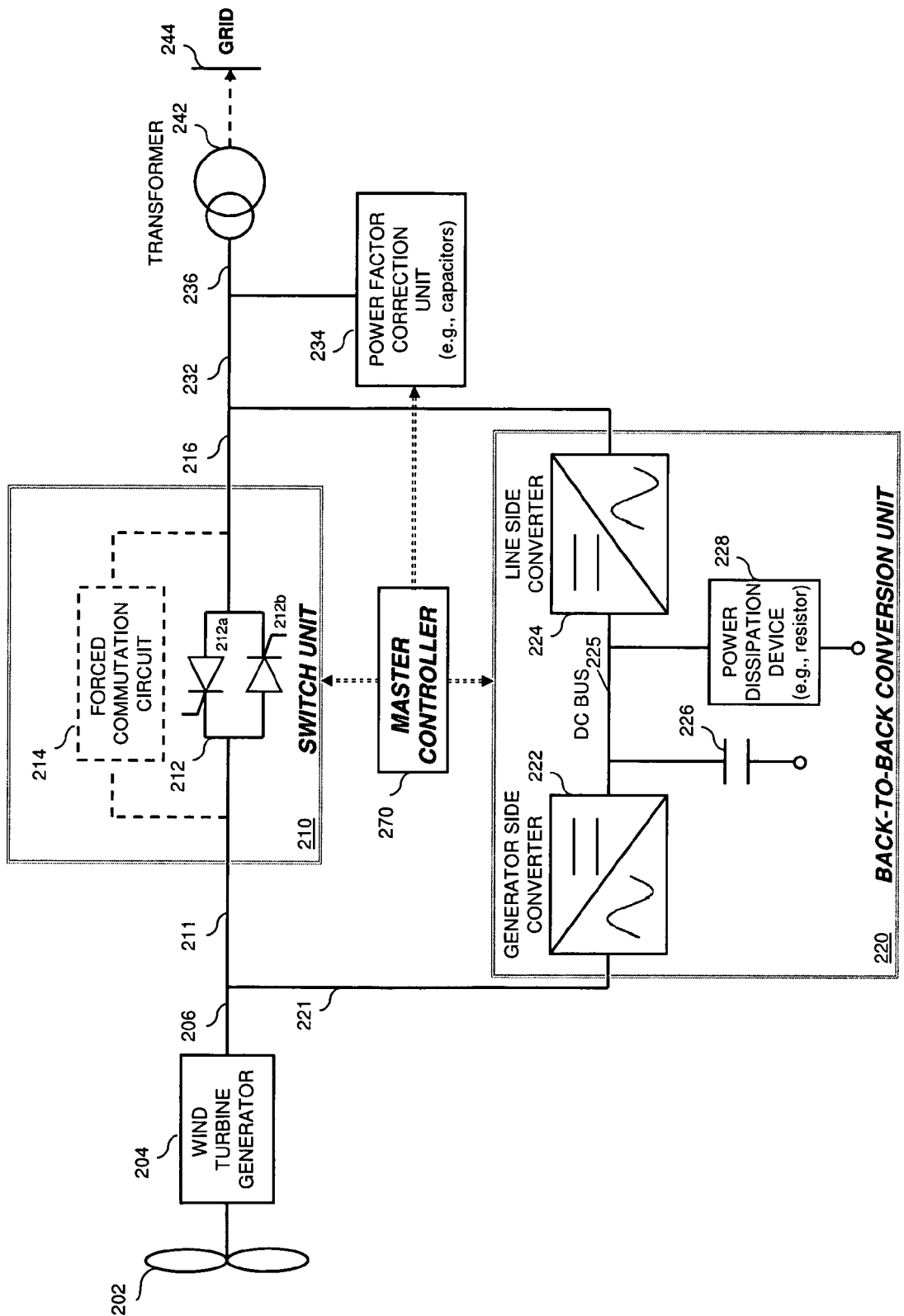

Referring to FIG. 2B, an exemplary implementation of the interconnection system 208 shown in FIG. 2A is provided. Each of switch unit 210, back-to-back conversion unit 220, master controller 270, and an optional power factor correction unit 234 is described in the following sections.

2.1 Switch Unit

Switch unit 210 includes a static switch 212 consisting of two controllable semiconductor switching devices, here, thyristors 212a and 212b. When closed, the pair of thyristors conducts AC current in alternative half-cycles, allowing the full output of the generator through the first path 211 with near zero voltage drop. Preferably, thyristors 212a and 212b are selected to be "over-sized" (i.e., current ratings higher than required) to minimize on-state power consumption.

Under low voltage conditions, to open the static switch 212, normally waiting for the current to be zero ("zero cross over") is needed to set thyristors in their off-state. If static switch 212 were to naturally commutate off due to an AC line current (e.g., a 50 Hz output of the generator), a time delay of up to 10 ms may occur before the 50 Hz current reaches a zero crossover. This time delay can be disadvantageous for a wind power generation system that is designed to adjust quickly to fault conditions (e.g., on the order of milliseconds). Therefore, a means of forced commutation of the thyristors is provided. In one method, switch unit 210 has a built-in forced commutation circuit 214 to which the thyristors are connected. When a control signal is received by the forced commutation circuit 214, the commutation circuit generates a current pulse of sufficient magnitude with a polarity that generates a zero crossover of current with the thyristors. By forced commutation, the static switch 212 can be quickly turned off to help reduce system response time and improve transient performance.

Alternatively, the back-to-back converters 222 and 224 can be controlled to also generate a commutation current pulse in the static switch thyristors 212.

2.2 Back-to-Back Conversion Unit

Back-to-back conversion unit 220 includes a generator-side AC/DC converter 222 and a line-side DC/AC converter 224 connected in series via a DC bus 225. Also coupled to DC bus 225 are one or multiple DC bus capacitors 226 which supports a DC bus voltage $V_{dc}$, and a power dissipation device 228 capable of dissipating real power. Power dissipation device 228 can include for example, a resistor (e.g., a dynamic braking resistor) to dissipate real power, and a controllable switching device that controls the amount of current passing through the resistor. In some examples, AC filter reactors (not shown) for reducing undesired harmonics and distortion in AC signals are also provided on both the generator and line sides.

When the grid voltage drops, the amount of real power that can be safely transferred to the grid without overloading WTG components decreases. With generator 204 continuing to operate, back-to-back conversion unit 220 receives the full output power of the generator while passing only a safe amount of power onto the grid. Real power in excess of the safe amount is dissipated by power dissipation device 228. As a result, power generation system 200 can ride through severe voltage drops without either 1) sending large amounts of current through transformer 242 (which may potentially damage the transformer and trip the turbine generator on over-current); or 2) increasing the speed of the turbine generator (which may potentially trip the generator on over-speed).

In some situations where it is desired to feed reactive power to utility grid 244 to help stabilize the grid at fault, line-side converter 224 is configured to provide not only real power but also reactive power in controlled amounts (e.g., reactive power at least twice as much as real power) to grid 244. The exact ratio of reactive to real power may be arbitrarily set or imposed by applicable grid interconnection requirements (e.g. the Spanish Grid Code). For some wind turbine generators (e.g., induction generators) that require reactive power to establish and sustain their electric and magnetic fields, generator-side converter 222 also provides reactive current necessary to keep the generators excited and operating at constant speed during low voltage events while simultaneously absorbing the real power output of the generator.

For some wind turbine generators (e.g., induction generators) that require reactive power to establish and sustain their electric and magnetic fields, generator-side converter 222 also provides reactive current necessary to keep the generators excited and operating at constant speed during low voltage events while simultaneously absorbing the real power output of the generator. In these type of generators, without the reactive current being applied under low voltage conditions, the generator sees reduced torque and begins to accelerate rapidly, which can damage the WTG.

2.3 Power Factor Correction Unit

In some wind power generation systems, a power factor correction unit 234 is optionally coupled to line-side terminal 232 for improving the power factor (PF) of the electricity delivered to utility grids. Generally, in an AC system where both real power and reactive power are present, PF is a dimensionless number between 0 and 1, representing the ratio of real power to total power (also referred to as apparent power). A power factor of zero indicates that energy flow in the circuit is entirely reactive and stored energy in the load returns to the source on each cycle, whereas a power factor of unity indicates that energy flow is entirely real and thus uni-directional from source to load. Under normal conditions, it is generally desirable to operate power generation systems at near unity power factor to provide high efficiency power to utility grids.

In wind power generation system 200, power factor correction unit 232 includes a group of capacitors that can be individually switched on and off by means of contactors (e.g., electrically controlled switches). During normal operation, these capacitors provide reactive power in adjustable amounts (e.g., depending on the number of capacitors switched on) to help achieve near unity power factor (e.g., above 0.9) at grid connection points. This power factor correction unit 232 may be provided as part of an existing wind turbine system, the interconnection system 208, or a combination of both.

2.4 Master Controller

Master controller 270 is coupled to each of static switch 212, forced commutation circuit 214, back-to-back conversion unit 220, and possibly other components in interconnection system 208. Master controller 270 oversees system operation and controls power transmission between the generator and the grid based on various grid conditions.

Figure 3:
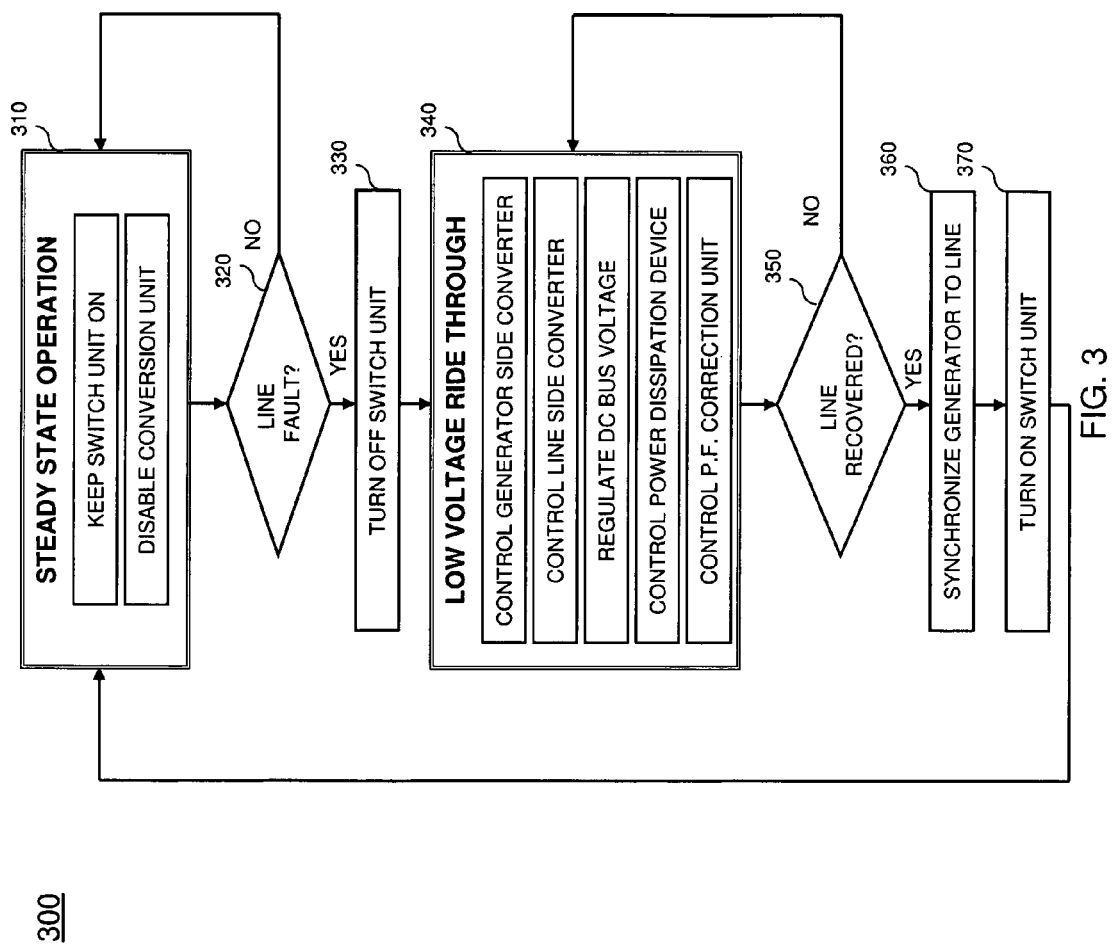
FIG. 3 is a flow chart illustrating a control scheme of the wind power generation system.

Referring to FIG. 3, the logic and functions of master controller 270 are briefly illustrated in a flow chart 300. Generally, the master controller uses feedback signals from multiple sensors (e.g., line-side and generator-side current/voltage sensors) to monitor current/voltage dynamics for determining system states. If the system is operating in steady state (step 310)—that is, grid voltage appears within ±10% of nominal, the master controller functions to maintain the on-state of the switch unit 210 and disable/disconnect the back-to-back conversion unit 220. As a result, power is transmitted to the transformer only through first path 211.

Line faults, including both unbalanced faults and sudden voltage drops, can be detected by the master controller upon sensing voltage or current anomalies. In many systems, a line fault is often followed by generator current exceeding a preset instantaneous level (e.g., 120% of nominal depending on system configuration), or line voltage falling below a preset threshold (e.g., 90% of nominal). In detecting either event, the master controller immediately turns off the switch unit (step 330) and initiates a low voltage ride through (step 340).

One way to turn off switch unit 210 is to command forced commutation circuit 214 to generate a defined width commutation current pulse to commutate off the thyristor (212a or 212b) that is in its conducting state. Pulse polarity can be determined as a function of generator current polarity. An alternative way to turn off the switch unit uses the generator-side and/or line-side converter. Current is injected by the converter in reverse direction to the existing current in thyristors, thereby creating zero current crossover that biases the thyristors off-state. In some systems, having a converter on each side of the switch unit helps offset source impedance effects that often contribute to the delay in thyristors' response time (i.e. line impedance limiting the rate of change in the commutation current). This commutation process can occur simultaneously on all three phases of the LVRT system regardless of how many line phases are faulted.

Once switch unit 210 is off master controller 270 controls the operation of back-to-back conversion unit 220 to provide LVRT capability. Here, the desired output of conversion unit 220 may vary depending on system design in compliance with specific grid connection standards. For example, to meet the requirements in the Spanish Grid Code, master controller 270 regulates conversion unit 220 so that 1) generator-side converter 222 receives generator power and provides reactive power to keep the generator excited and rotating at constant speed; and 2) line-side converter 224 supplies a safe amount of real power to grid 244 and injects sufficient reactive power to help stabilize the grid. Generator power in excess of the amount that can be safely absorbed by grid 244 is dissipated by power dissipation device 228, which consumes power in response to a regulated DC bus voltage, or can be controlled directly by matching the power dissipated to the excess generator power. Optionally, master controller 270 also controls power factor correction unit 234 to provide reactive power in suitable amounts for improving power factor at gird connection points.

After fault clearance, grid voltage begins to recover. When detected line voltage has restored nearly to its pre-fault level (e.g., above 90%), generator side converter 222 synchronizes the generator voltage and phase to that of the grid (step 360) and switch unit 210 is quickly turned on (step 370). With back-to-back conversion unit 220 disconnected again from the generator, the system returns to steady state operation (step 310), feeding generator power through the first path 211 to the transformer 242.

3 Examples of Steady-State and Transient Operations

FIGS. 4A to 4D further illustrate how an interconnection system operates to provide satisfactory electric power to utility grids in ways that conform to the Spanish Grid Code. Circuit performance during each of several stages, including a steady state and multiple transient states following a low voltage event, is described in detail below.

Figure 4A:
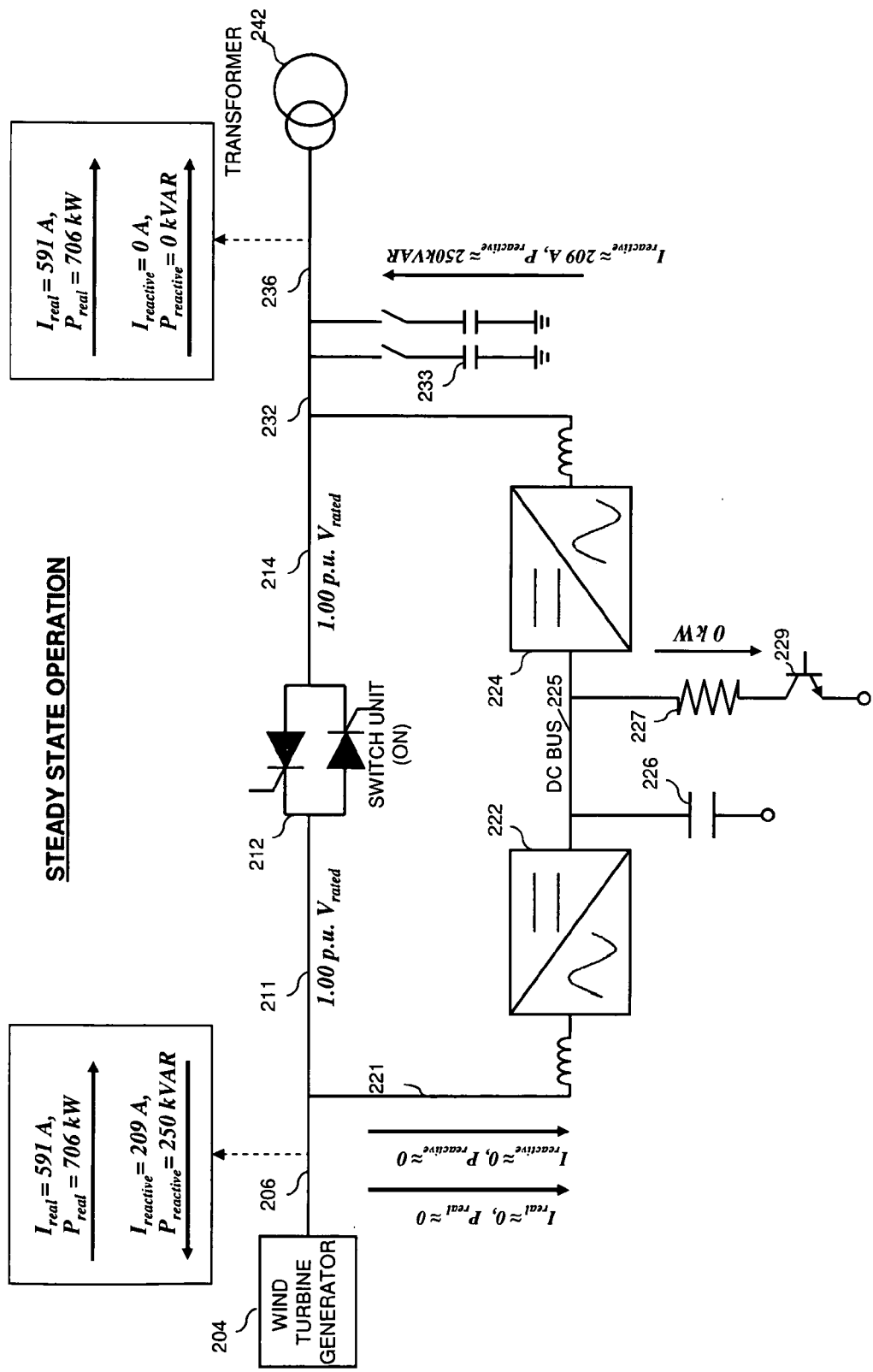
FIGS. 4A to 4D are examples of steady-state and transient operations of one implementation of the wind power generation system.

Referring to FIG. 4A, wind power generation system 200 is operating in steady state with line-side voltage at nearly 100% of rated level. In this case, 706 kW of real power produced by turbine generator 204 is delivered entirely through switch unit 212 to transformer 242, with less than 0.3% of energy loss. No power passes through generator-side converter 222, line-side converter 224, or the power dissipation device (e.g., a resistor 227). The power factor correction unit (e.g., a set of capacitors 233) provides about 250 kVAR of reactive power to excite the wind turbine generator 204. With zero net reactive output at terminal 236, electricity is being provided to the grid at a power factor of unity.

Figure 4B:
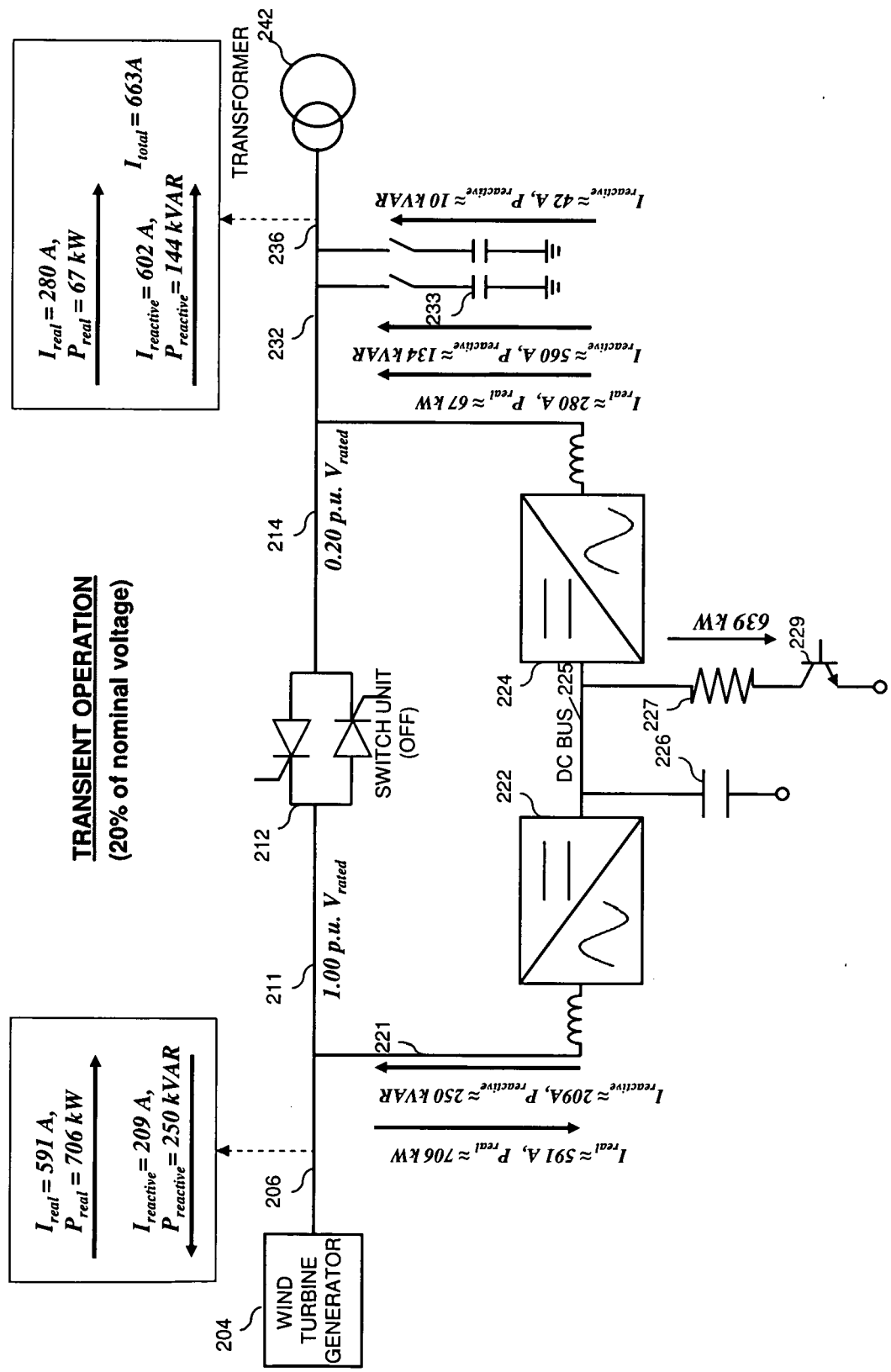

Referring now to FIG. 4B, when a grid failure causes line-side voltage to drop to 20% of rated levels, the switch unit 212 is quickly turned off (e.g., by forced commutation) to disconnect generator 204 from AC line 232. Subsequently, generator-side converter 222 is controlled to absorb real power from generator 204 to prevent the turbine from storing power and overspeeding. As converter 222 now provides the reactive exciting current (which was formerly supplied by the power correction unit 233, the utility, or a combination of both), the generator continues to be excited. At the same time, generator-side voltage is maintained by the converter 222 at near rated level (although line voltage has fallen to 20%).

Once real power starts flowing into generator-side converter 222 and onto DC bus 225, the DC bus voltage begins to rise. In response, line-side converter 224 starts to operate to supply both real and reactive current to AC line 232. In this example, the amount of real and reactive current transferred by line-side converter 224 is controlled such that the reactive power is twice the real power (e.g., 134 kVAR and 67 kW, respectively) and the total current does not significantly exceed the current rating of the turbine transformer 242. Since only a small portion of the generated power (67 kW out of 706 kW) is transferred to the AC line 232, energy builds up on DC bus 225. This excess power (about 639 kW) is dissipated in resistor 227, for example, by modulating the duty cycle of a switching device 229 to which the resistor 227 is coupled.

At AC line 232, the net output of line-side converter 224 includes 280A of real current and 560A of reactive current. Together with the diminished reactive current provided by the power factor correction unit 233 (at 20% of line voltage, the correction unit provides 20% of rated current), the total current supplied to the transformer 242 is 663A. This amount of total current represents only 106% of transformer rating (well within transformer capability), with an $I_{reactive}/I_{total}$ ratio of 0.907.

Figure 4C:
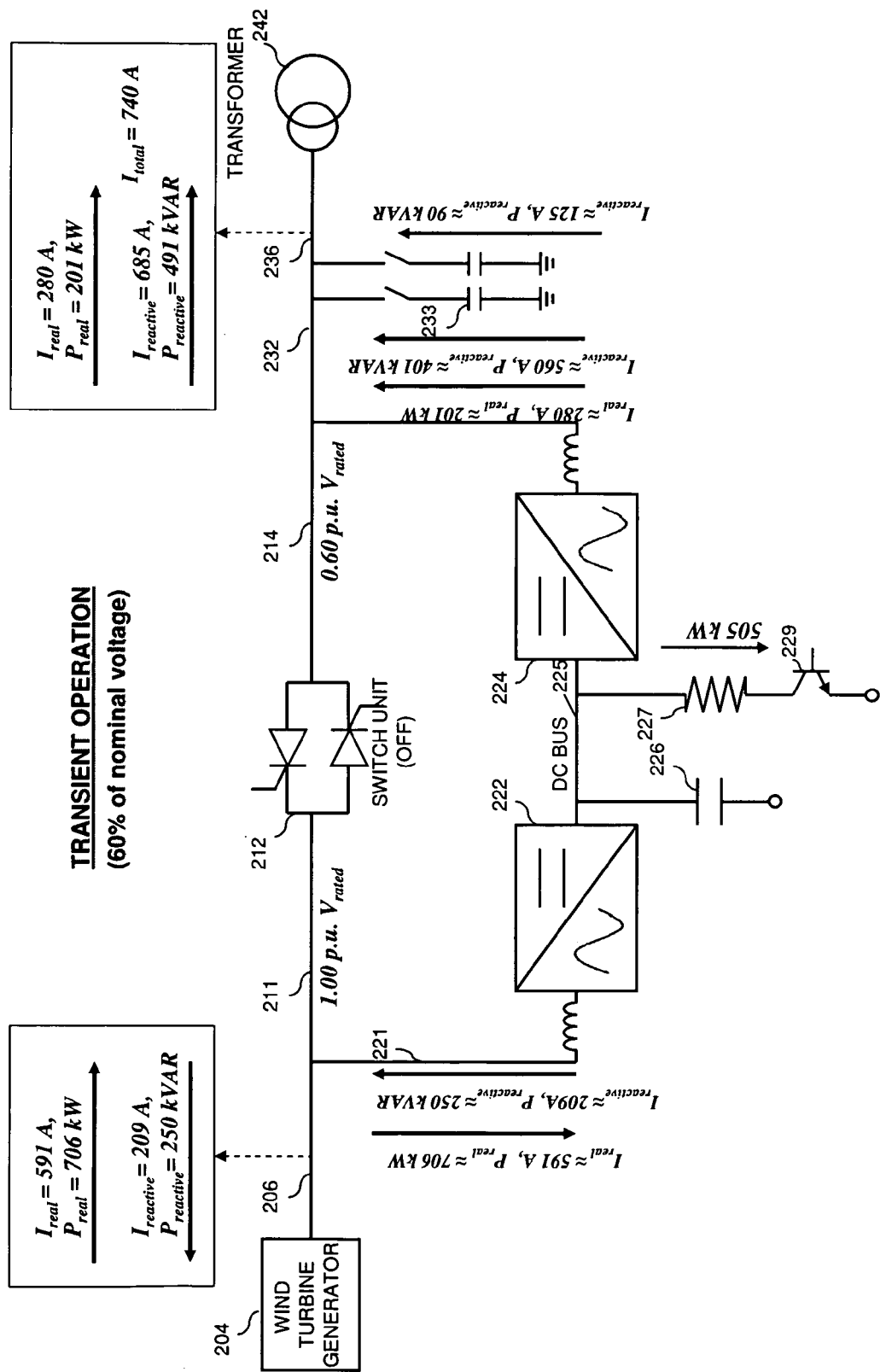

Referring now to FIG. 4C, as line voltage starts to recover from the fault, the amount of real power that can be transferred to the grid increases, and the amount of power to be dissipated in resistor 227 drops. For example, with line voltage at 60% of pre-fault level, line-side converter 224 transfers about 201 kW of real power to AC line 232, and the power dissipated by resistor 227 is reduced to 505 kW. Including the contribution of the power factor correction unit 233, the net current provided to the transformer now increases to 740A (i.e., 118% of transformer current rating). The $I_{reactive}/I_{total}$ ratio of the net current is 0.926.

Figure 4D:
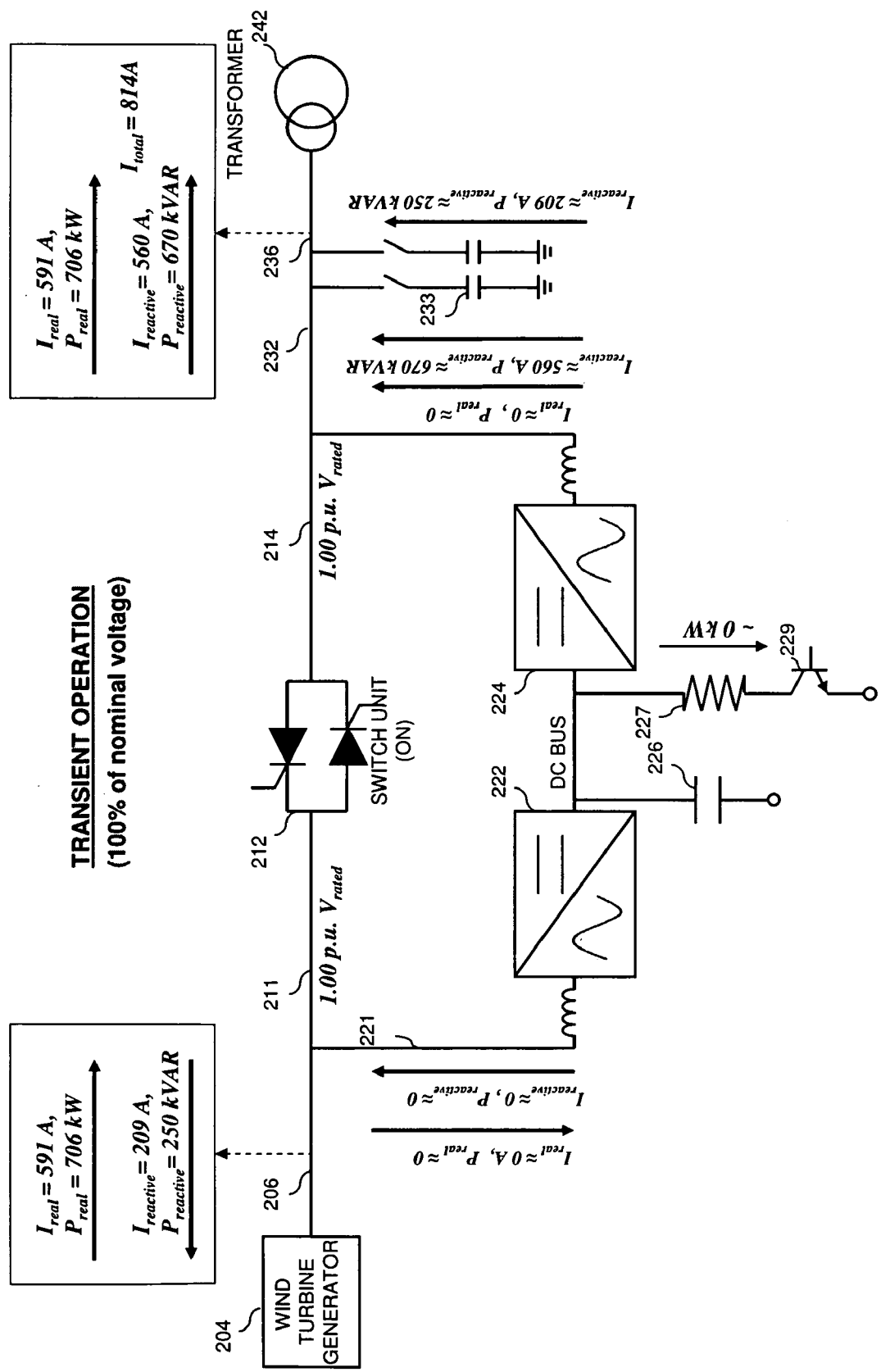

Referring now to FIG. 4D, once the line-side voltage recovers to near rated level (e.g., above 95%), the switch unit 212 is turned on after the generator side converter synchronizes the generator voltage and phase to that of the grid. As real power from the turbine resumes flowing through switch unit 212 to AC line 232, both generator-side converter 222 and line-side converter 224 cease to transfer real power. Resistor 227 no longer dissipates power. Subsequently, interconnection system 208 returns to operate in steady state (as previously shown in FIG. 4A). In some cases, before returning to steady-state, line-side converter 224 may continue to supply reactive current for an extended period (e.g., 150 ms) unless line voltage exceeds a predetermined level (e.g., 110% of nominal). Preferably, this additional supply of reactive current provides post-fault voltage support that may be desired in some systems following a major low voltage event.

In this application, although some examples are provided primarily in the context of a system designed to satisfy the Spanish Grid Code, the approach described above can be generally applied in many power generation systems to provide steady-state and transient fault behaviors that satisfy the requirements of one or multiple grid interconnection standards. In addition to providing low-voltage ride through, the interconnection systems described in FIGS. 2A and 2B may also be modified to allow wind turbine generators to continue to operate and supply electricity to grid under other fault conditions. Moreover, the power electronics used in these systems can be conveniently coupled to a wide variety of wind turbine generators (e.g., Squirrel Cage Induction Generators, Doubly Fed Induction Generators, and Synchronous Generators) operating in either constant speed or variable speed modes.

There can be many alternatives to the thyristors used in the static switch. For instance, thyristors capable of switching off by gate control (instead of zero current) can be coupled in use with the master controller that is configured to provide such gate control signals. Examples of gate control thyristors include Gate Turn-Off thyristors (GTOs) and Integrated Gate-Commutated Thyristors (IGCTs). There are also non-thyristor solid-state devices (e.g., transistors) that could be used for the static switch.

Line faults may be detected by the master controller upon sensing generator current exceeding a preset instantaneous level, or line voltage falling below a preset threshold. Alternatively, the master control may monitor a rate of change of line voltage and/or current together with absolute thresholds as a means of detecting a sag event.

In the event of small voltage sags, it is also possible to leave the static switch closed while commanding one or both of the converters to output capacitive reactive power. This capacitive reactance may interact with existing transformer and source impedance to help achieve a voltage boost.

In some applications, during low voltage events, the line-side converter is controlled to provide power compensation by outputting reactive current that is twice the amplitude of real current. In some other applications, line-side converter may instead output zero real current while providing capacitive reactive current of an arbitrary amount (up to the overload limit of the converter). In addition, both line-side and generator-side converters may operate in an "overload" mode to reduce cost. Operating converters in so-called "overload" mode is described in U.S. Pat. No. 6,577,108, which issued on Jun. 10, 2003 and whose disclosure is incorporated herein by reference.

During normal WTG operations, one or both of the converters may be turned on to provide additional power-factor correction. For example, in cases where wind turbine power factor correction units are only capable of improving PF to 0.95 lagging (inductive), this additional PF correction from converter(s) can potentially boost the PF to 1.0, or even to a leading (capacitive) PF when desired.

It is to be understood that the foregoing description is intended to illustrate and not to limit the scope of the invention, which is defined by the scope of the appended claims. Other embodiments are within the scope of the following claims.

What is claimed is:

1. A system for connecting a wind turbine generator to a utility power network, the system comprising: a first power converter for converting an AC signal from the wind turbine generator to a DC signal and for supplying a controlled amount of reactive current to the wind turbine generator, a second power converter connected in series with the first converter for converting the DC signal from the first power converter to a line-side AC signal and for supplying a controlled amount of reactive current to the utility power network during a low voltage event, and a power dissipation element coupled to the first and second power converters for dissipating power from the first power converter, wherein the controlled amount of reactive current supplied to the utility power network satisfies a predetermined criterion associated with a voltage condition of the utility power network, and wherein when a voltage of the utility power network falls below a predetermined threshold, the controlled amount of reactive current satisfies the criterion that the magnitude of reactive current supplied to the utility power network be at least twice as the magnitude of real current supplied to the utility power network.

2. The system of claim 1, wherein the first and second power converter are connected via a DC bus.

3. The system of claim 2, further comprising a capacitor coupled to the DC bus.

4. The system of claim 1, wherein the power dissipation element further includes a controllable switching device coupled to the resistor and configured for regulating a current passing through the resistor.

5. The system of claim 1, further comprising a first and second AC filter reactor coupled to the first and second power converter, respectively.

6. The system of claim 1, further comprising a power factor correction unit configured for adjusting a power factor of the electric power supplied to the utility power network.

7. The system of claim 6, wherein the power factor correction unit includes at least one controllable capacitor that can be switched on and off by electrical signals.

8. A control system for controlling an interconnection between a wind turbine generator and a utility power network, the control system configured for: electrically opening a first path of the interconnection upon an occurrence of a low voltage event, wherein the first path includes an electrically controllable switch, the electrically controllable switch being opened upon an occurrence of the low voltage event; and controlling a second path of the interconnection during the low voltage event to provide a first current suitable for maintaining an operation of the wind turbine generator and a second current having a reactive component with a predetermined characteristic associated with an operation of the utility power network wherein the second path includes a first power converter for converting an AC signal from the wind turbine generator to a DC signal and for supplying a controlled amount of reactive current to the wind turbine generator, a second power converter connected in series with the first converter for converting the DC signal from the first power converter to a line-side AC signal and for supplying a controlled amount of reactive current to the utility power network during a low voltage event, and a power dissipation element coupled to the first and second power converters for dissipating power from the first power converter.

9. The control system of claim 8, further configured for determining the occurrence of a low voltage event based on a current condition associated with the wind turbine generator.

10. The control system of claim 8, wherein the second path further includes a capacitor coupled to the first and second power converter.

11. The control system of claim 8, wherein the first path includes a switch unit controllable by external signals.

12. The control system of claim 11, wherein the first path further includes a forced commutation circuit configured to provide a commutation signal to the switch unit.

13. The system of claim 11, wherein the first and second power converters are controlled to provide a commutation current pulse to the switch unit.

14. The control system of claim 8, wherein the first current includes a reactive current component sufficient for maintaining an excitation of the wind turbine generator.

15. A for connecting a wind turbine generator to a utility power network, the system comprising a first path including an electrically controllable switch, the electrically controllable switch being opened upon an occurrence of a low voltage event, and a second path in parallel with the first path, the second path configured to provide, during the low voltage event, a first current suitable for maintaining an operation of the wind turbine generator and a second current having a reactive component with a predetermined characteristic associated with a voltage condition of the utility power network, wherein the second path includes: a first power converter for converting an AC signal from the wind turbine generator to a DC signal and for supplying a controlled amount of reactive current to the wind turbine generator; a second power converter connected in series with the first converter for converting the DC signal from the first power converter to a line-side AC signal and for supplying a controlled amount of reactive current to the utility power network during a low voltage event; and a power dissipation element coupled to the first and second power converters for dissipating power from the first power converter.

16. The system of claim 15, wherein the electrically controllable switch is coupled to a forced commutation circuit, the forced commutation circuit being configured to provide a commutation signal to open the electrically controllable switch upon the occurrence of the low voltage event.

17. The system of claim 15, wherein the electrically controllable switch includes a pair of anti-parallel thyristors.

18. The system of claim 15, wherein, when the voltage condition of the utility power network satisfies a normal range, the electrically controllable switch is closed to bypass the second path.

19. The system of claim 15, wherein the controlled amount of reactive current supplied to the utility power network satisfies a predetermined criterion associated with a voltage condition of the utility power network.

20. The system of claim 19, wherein when a voltage of the utility power network falls below a predetermined threshold, the controlled amount of reactive current satisfies the criterion that the magnitude of reactive current supplied to the utility power network be at least twice as the magnitude of real current supplied to the utility power network.

21. The system of claim 15, wherein the first and second power converter are connected via a DC bus.

22. The system of claim 21, further comprising a capacitor coupled to the DC bus.

23. The system of claim 15, wherein the power dissipation element further includes a controllable switching device coupled to the resistor and configured for regulating a current passing through the resistor.

24. The system of claim 15, further comprising a first and second AC filter reactor coupled to the first and second power converter, respectively.

25. The system of claim 15, further comprising a power factor correction unit configured for adjusting a power factor of the electric power supplied to the utility power network.

26. The system of claim 25, wherein the power factor correction unit includes at least one controllable capacitor that can be switched on and off by electrical signals.

* * * * *